April 16, 1968 B. W. SMITH 3,378,369
METHOD OF MOLDING POWDERED METAL
Original Filed April 6, 1964 6 Sheets-Sheet 1

INVENTOR.
BRUCE W. SMITH
BY
Agent

April 16, 1968

B. W. SMITH 3,378,369

METHOD OF MOLDING POWDERED METAL

Original Filed April 6, 1964

INVENTOR.
BRUCE W. SMITH
BY
George C. Sullivan
Agent

INVENTOR.
BRUCE W. SMITH
BY
George C. Sullivan
Agent

April 16, 1968  B. W. SMITH  3,378,369
METHOD OF MOLDING POWDERED METAL
Original Filed April 6, 1964  6 Sheets-Sheet 4
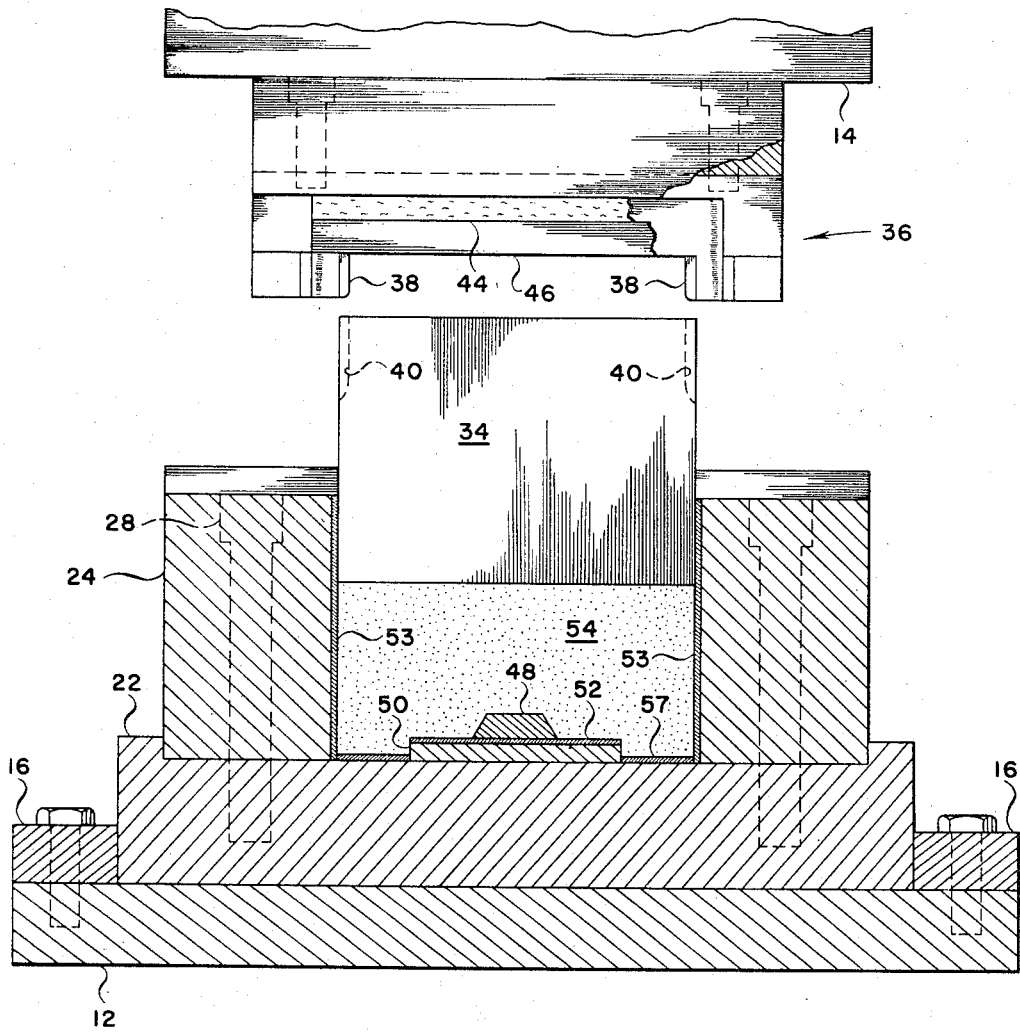
Fig. 4
Fig. 5
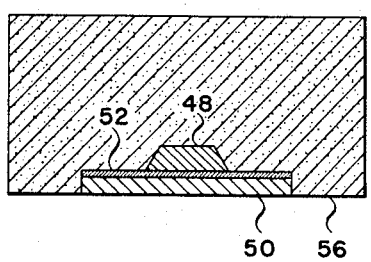
INVENTOR.
BRUCE W. SMITH
BY
Agent

INVENTOR.
BRUCE W. SMITH

United States Patent Office 3,378,369
Patented Apr. 16, 1968

3,378,369
METHOD OF MOLDING POWDERED METAL
Bruce W. Smith, Pacoima, Calif., assignor to Lockheed Aircraft Corporation, Burbank, Calif.
Original application Apr. 6, 1964, Ser. No. 357,463, now Patent No. 3,288,365. Divided and this application Oct. 31, 1966, Ser. No. 590,986
8 Claims. (Cl. 75—206)

ABSTRACT OF THE DISCLOSURE

A method of molding a powdered metal body within a mold comprising the steps of placing a quantity of powdered metal within the mold, and selectively compacting a portion of the quantity of powdered metal while preventing the remaining portion from expanding.

---

This is a division of application Ser. No. 357,463, filed Apr. 6, 1964, now Patent No. 3,288,365.

This invention pertains to new and improved apparatus for molding so-called "powdered metal" parts such as dies. This invention also pertains to new and improved procedures or methods for forming powdered metal parts such as dies.

For reasons which are not related to an understanding of the present invention, virtually a limitless number of different items are currently produced by powdered metallurgical techniques. In processes of this type it is conventional to place powdered metal, such as powdered iron, into a mold having a desired internal configuration, and then to press the powdered metal so as to form a relatively void-free structure or body held together because of physical deformation of the powdered metal. After such a body is formed it normally is removed from the mold and sintered at an elevated temperature so as to bond the metal powder into a unitary structure.

The type of procedure indicated in the preceding paragraph is valuable commercially. However, there are limitations on this type of process which make it relatively impossible to provide powdered metal products of a desired internal character, and which make it substantially impossible to provide products of this type which are accurately dimensioned. Thus, for example, the use of a single conventional plunger in compacting powdered metal gives rise to or produces a structure having a significant density and internal stress variations throughout its depth. Such density variations are particularly pronounced adjacent to corners or in non-regular shapes. Such variations affect the physical properties of a final "powdered metal" product. Similarly, during the removal from the mold and the sintering step in producing such a product, a powdered metal type body will tend to deform to some extent. This, of course, may make such a body unacceptable for its intended purpose.

A further object of the present invention is to provide a new and improved method of compacting powdered metal bodies so as to achieve satisfactory or desired internal structures within these bodies. A closely related object of this invention is to provide a method such that a relatively small amount of pressure can be utilized to produce relatively large, compacted powdered metal structures.

An additional object of the present invention is to provide a process for manufacturing sintered powdered metal type bodies or structures so as to control the dimensions of such bodies or structures in order to prevent deformation during a sintering operation. Still further objects of the present invention are to provide methods of the type indicated which are relatively simple to carry out, which are effective and which can be practiced at a nominal cost with a minimum of difficulty.

These and various other objects of this invention as well as many specific advantages of it will be more fully apparent from a detailed consideration of the remainder of this specification, the appended claims and the accompanying drawings in which:

FIGURE 4 is a cross-sectional view corresponding to a view taken at line 4—4 of FIGURE 1 illustrating the use of the apparatus shown in the preceding figures in forming a body from powdered metal;

FIGURE 5 is a diagrammatic cross-sectional view illustrating the manner in which a body formed as indicated in FIGURE 4 is held as it is sintered;

Figure 1:
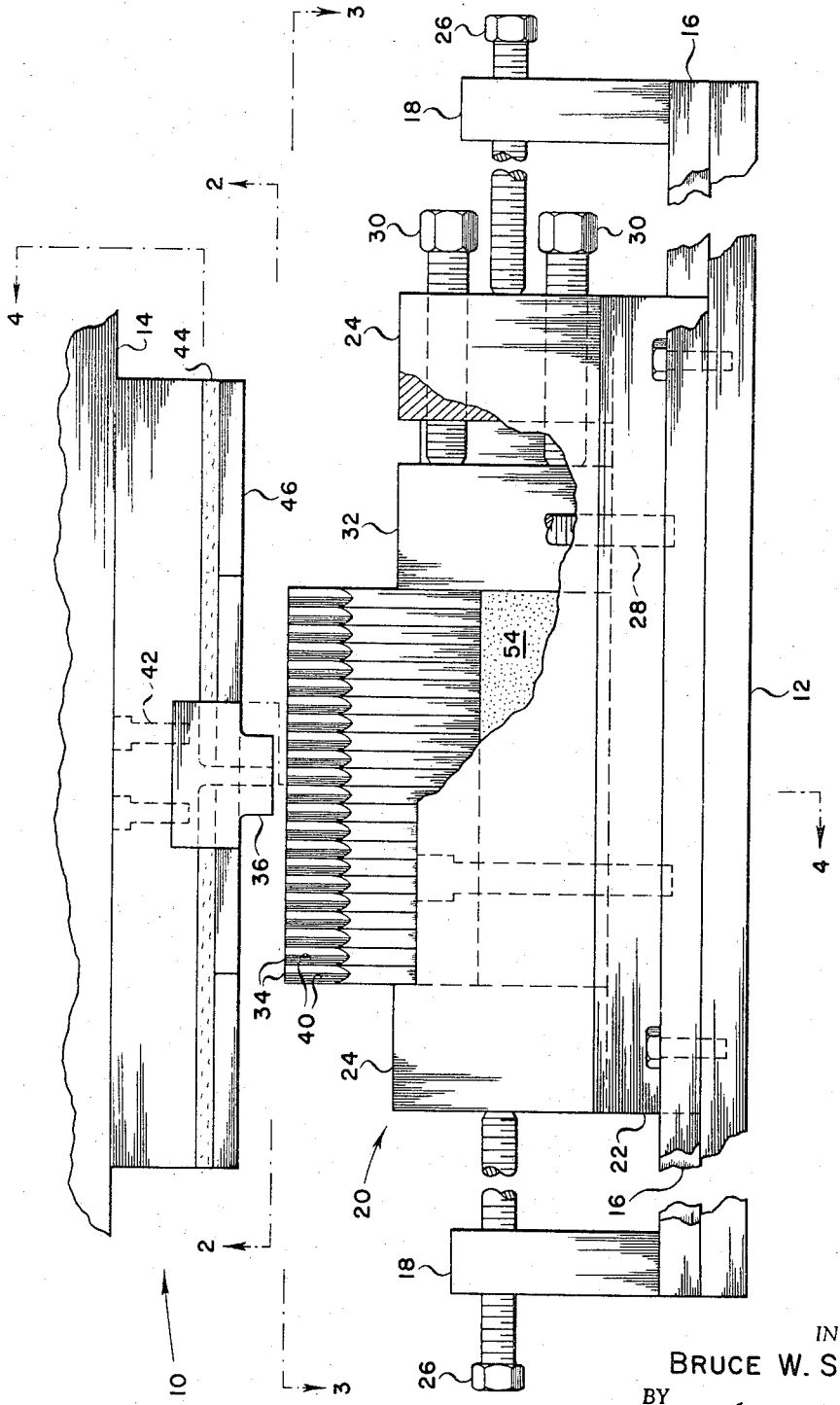
FIGURE 1 is a side elevational view of an apparatus of the present invention.
Figure 2:
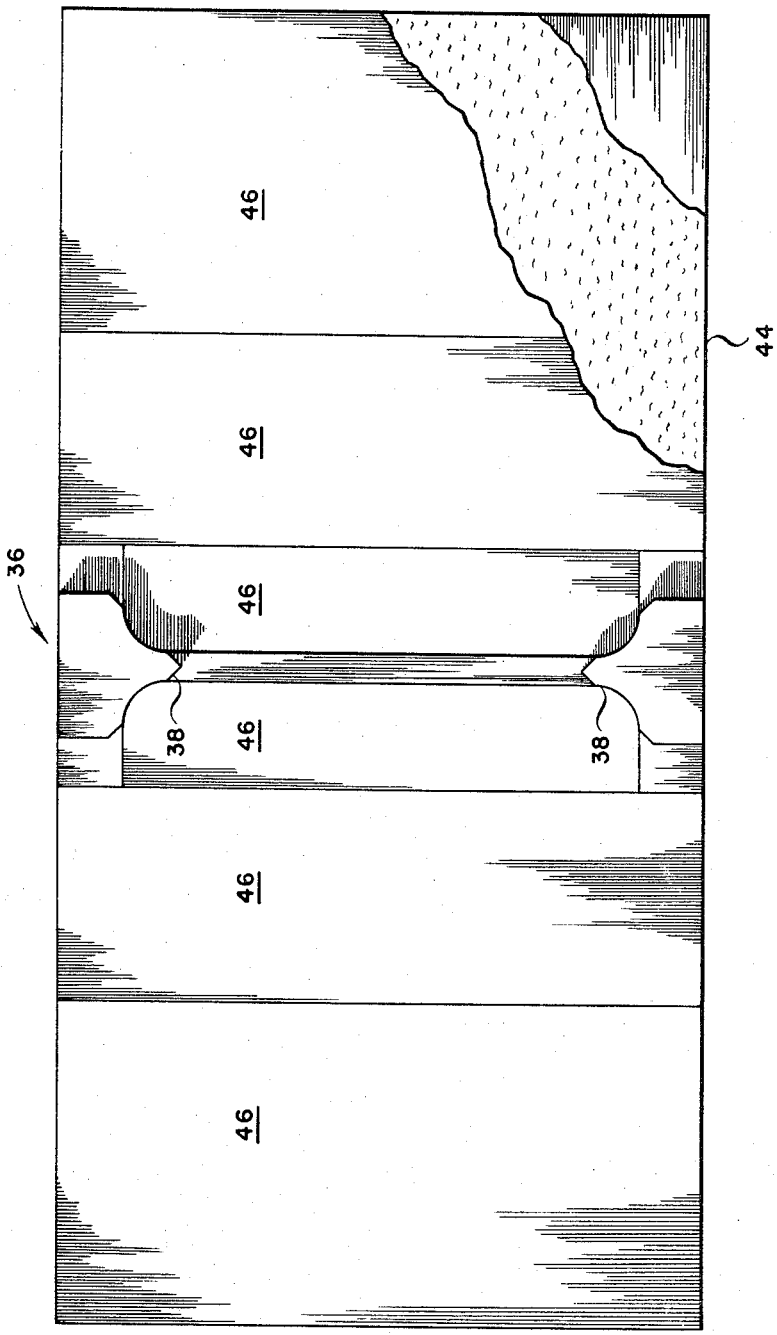
FIGURE 2 is a cross-sectional view taken at line 2—2 of FIGURE 1.
Figure 3:
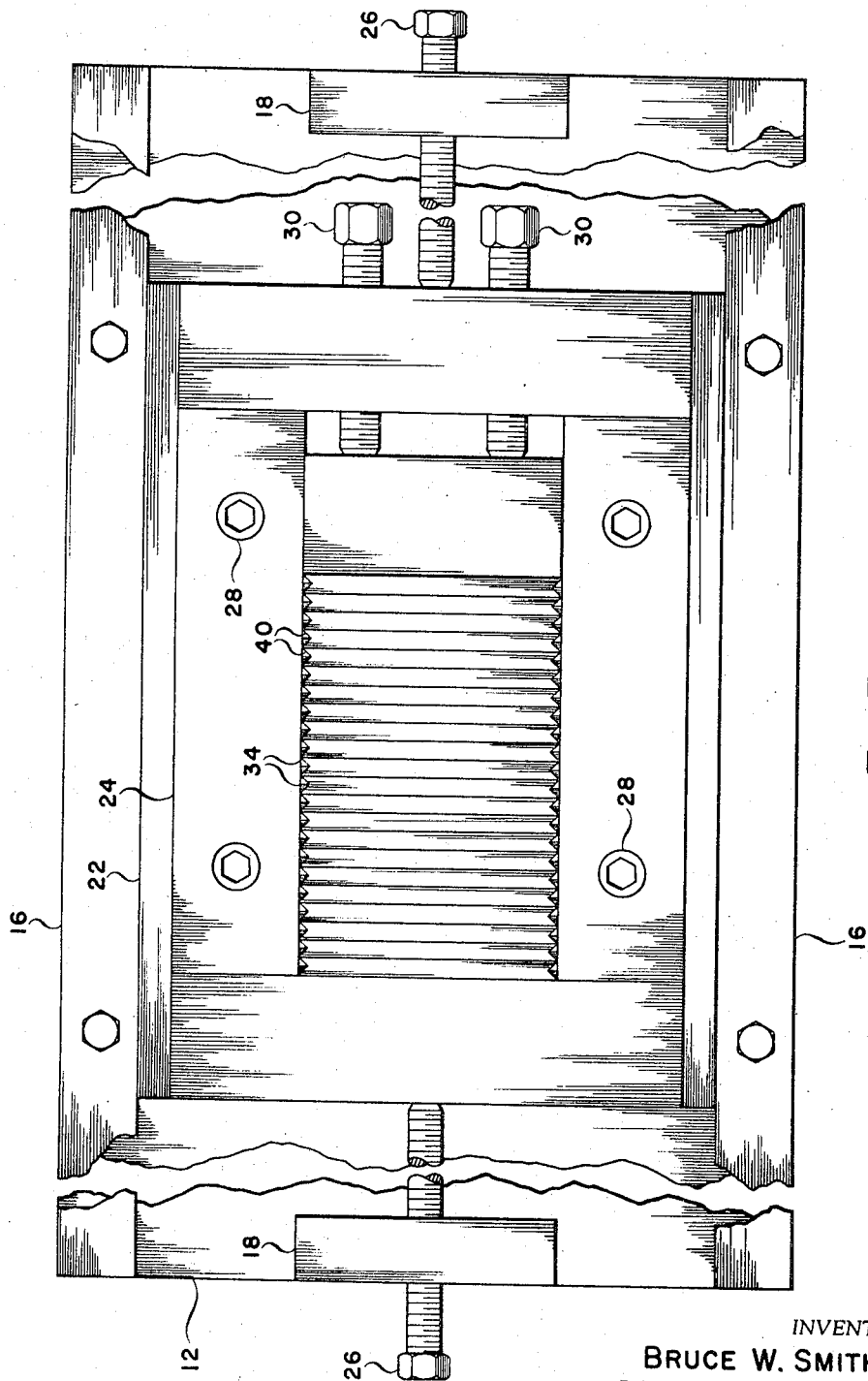
FIGURE 3 is a cross-sectional view taken at line 3—3 of FIGURE 1.

From a careful consideration of the drawings those skilled in the powdered metallurgy field will realize that these drawings are primarily intended so as to illustrate features of this invention. Because they are intended for this purpose they are not to be considered as limiting this invention in any respect.

As an aid to understanding this invention it can be stated in a summary manner that it concerns a method of compacting powdered metal bodies which, for illustrative purposes, is described in conjunction with an apparatus including: a mold having a bottom and parallel sides, a plurality of compacting members extending parallel to these sides into the interior of the mold, means for forcing any one of these members into the interior of the mold and means for preventing the other of these members from moving out of the mold as one of the members is being forced into it. As an apparatus of this type is used powdered metal is located within the mold and is preferably selectively compacted by different of the members specified while the other of the members are held in or substantially in position. Preferably, in practicing the invention, the powdered metal is forced against a member located within the bottom of the mold, and this member is then sintered along with the body created in the mold. In order to prevent bonding during such sintering a parting or release agent is used on the exposed surface of such a member.

Any summary of this category inherently omits many details necessary to complete understanding of an invention. Such details with respect to this invention will be apparent from a consideration of the accompanying drawings. Here there is shown a molding apparatus 10 which includes as a part of this apparatus a fixed platen 12 and a spaced movable platen 14. The platen 14 is capable of being moved toward or away from the fixed platen 12 in a linear path. Preferably these platens 12 and 14 form a part of a conventional hydraulic press (not shown). The fixed platen 12 is provided with parallel guide rails 16 and positioning brackets 18 located between these guide rails.

A mold 20 having a flat bottom 22 and parallel upstanding side and end walls 24 is located on the fixed platen 12 so as to fit closely between the guide rails 16. Positioning screws 26 are carried on brackets 18 so as to extend into engagement with the bottom 22. By adjusting the screws 26 the position of the mold 20 along the rails 16 on the platen 12 may be changed as required during the use of the apparatus 10.

The walls 24 in the mold 20 are secured to the bottom 22 by means of bolts 28. One of the walls 24 carries friction screws 30 which extend into the interior of the mold 20. These screws 30 rest against a friction block 32 used for what are essentially assembly purposes in assembling the complete apparatus 10. With this structure the effective volume of the interior of the mold 22 can be changed through adjustment of the screws 30 causing a change in the position of the block 32.

In the apparatus 10 a plurality of comparatively thin but rigid plate-like compacting members 34 are held between the friction block 32 and the opposite wall 24 of the mold 20 under sufficient pressure so that these members 34 are capable of being moved with respect to the bottom 22 of the mold 20.

In the apparatus 10 a plunger member 36 is utilized in order to move any one of the compacting members 34 toward the interior and bottom 22 of the mold 20. This plunger 36 preferably includes vertically extending stabilizing surfaces 38 of a generally V-shaped configuration which are adapted to mate with edge grooves 40 on any of the compacting members 34 in order to stabilize any of these compacting members. The particular shape of the surfaces 38 and the edge grooves 40 is considered desirable in preventing bending or twisting of the compacting members 34 during the use of the apparatus 10 and in causing these members to be capable of being moved toward the bottom 22 of the mold 20 without binding.

The plunger member 36 is mounted on the movable platen 14 by means of mounting screws 42 generally in the center region of this platen. Other portions of the movable platen 14 carry layers 44 of cork or a resilient material such as rubber surmounted by a layer 46 forming a metal pressure plate. This layer 44 is capable of being compressed; layers 44 and 46 may be secured in place by a conventional adhesive (not shown).

The movable platen 14 is located with respect to the fixed platen 12 so that the mold 20 is capable of being moved into a position in which the plunger member 36 can be brought onto engagement with any one of the compacting members 34. This movable platen 14 is also dimensioned so that in any position of the plunger member 36 in engagement with one of the compacting members 34 the remainder of these compacting members will be engaged by the layers 46.

The significance of this structure of the apparatus 10 will be apparent from consideration of FIGURE 4 of the drawing. During the use of this apparatus 10 in creating a part such as a form die or mold, a punch such as a tool steel punch 48 is located upon a metal punch plate 50. Preferably, the punch 48 is held in place on the plate 50 through the use of adhesively coated paper 52 although this is not necessary. Sheets 53 such as cardboard sheets or wax paper preferably (shown representatively in FIGURE 4) are usually used to line the mold. Sheets 53 serve to lubricate the mold and reduce the force required to remove compacted metal powder body 56 from mold 20 (shown in FIGURE 5). The punch plate 50 and the punch 48 are then located on the bottom 22 of the mold 20. This mold is next filled to an intended level with a desired quantity of metal powder 54 such as iron powder.

Then the compacting members 34 are inserted into the mold and are fitted tightly against one another through adjustment of the position of the friction block 32 by using the friction screws 30. The positioning screws 26 are then adjusted so as to locate the mold with respect to the plunger member 36 above any desired one of the compacting members 34.

At this time the movable platen 14 is brought toward the fixed platen 12, causing the plunger member 36 to move so that the surfaces 38 on it engage the edge grooves 40 on this one of the compacting members 34. After such engagement as the movable platen 14 is moved toward the fixed platen 12 this one of the compacting members 34 will be pushed into the interior of the mold 20. As it is pushed in this manner the other of the compacting members 34 will be engaged by the layers 46.

Such engagement will prevent these other compacting members 34 from being forced out of or away from the mold 20 due to the powder 54 moving in a fluid-like manner. Also, there will be a limited movement of these other compacting members 34 toward the fixed platen 12 into the interior of the mold 20 as the result of pressure exerted through the layers 44 and 46. From this it will be apparent that these two layers 44 and 46 operate essentially as means for preventing compaction members 34 from moving out of or away from the mold 20 as the plunger member 36 operates as a means for forcing one of the compacting members 34 into the mold 20.

After one of the compacting members 34 has been moved into the mold 20 as described the movable platen 14 is moved away from the fixed platen 12 and the mold 20 so that the plunger member 36 no longer engages any of the compacting members 34. The position of the mold 20 is then changed through the use of the positioning screws 26 so that the plunger member 36 is aligned with another of the compacting members 34. The movable platen 14 is then moved as previously described so as to force the newly engaged compacting member 34 against the powder 54 within the mold.

This sequence of operations is continued with each of the compacting members 34 being engaged by the plunger member 36 at least once. Preferably, however, each of the compacting members 34 is engaged and pressed several times; to only a limited extent the initial time it is engaged and pressed as described, and thereafter is pressed downwardly to a reasonably great extent. During the last of these steps pressures of from 30 to 70 tons per square inch should be applied through a compacting member.

This sequence of operations enables the powder 54 to be selectively compressed in different regions or areas in such a way as to avoid undesired density effects and internal stresses and strains produced through the use of a single compacting plunger. Through the application of force to compacting members 34 located in regions where comparatively high density is desired deliberate increases in density may be achieved in these regions or areas. From this, it will be realized that a comparatively small amount of pressure applied through the movable platen 14 can be used to create a comparatively large, relatively dense body within the mold 20 from the powder 54 because of the fact that the pressure applied is applied in only a comparatively small or restricted area.

When comparatively high densities are required in the vicinity of the punch 48, at corners or other similar members or places within the mold 20 such densities can be achieved through selective actuation of compacting members 34 as indicated in the preceding. By disassembling the mold 20 after the sequence of operations described and removing the paper 52, then reassembling the mold with the punch 48 and the punch plate 50 in position and then repeating the compacting operations comparatively high densities can be achieved in the area of the punch 48.

A body 56 (FIGURE 5) formed of the powder 54 using the procedure indicated above can be sintered in accordance with conventional techniques as soon as it is removed from the mold 20. With the present invention, however, it is considered desirable to sinter such a body 56 with the part against which it is formed in place with respect to the body 56. This procedure tends to eliminate or prevent deformation of the powdered metal part or body 56 during the sintering operation. In order to sinter in this manner it is necessary to coat the part used for forming purposes with a parting agent preventing bonding of the compacted material to such a part during the sintering operation.

If desired a sheet 57 of paper such as bond paper or waxed paper can be located around the punch 50 as a body such as the body 56 is being formed. The density of the surface of this body 56 may be improved or increased by removing this sheet 57 after the mold 20 is disassembled, then reassembling the mold 20 with the body 56 and all other parts in the positions during the initial molding process, and next repeating the sequence of compacting steps indicated.

As a parting agent it is possible to utilize a thin adherent film of substantially a thin paint-like thickness of a relatively soft metallic oxide such as an oxide selected from the group of titanium dioxide, zirconium dioxide, stannic dioxide, and lead dioxide and zinc dioxide. If desired, such oxides may be applied to a surface through the use of a volatile binder-carrier solution of approximately the character of thin paint such as an aqueous solution of gum arabic or a lacquer solution of nitrocellulose in a solvent or the like. Such a solution should contain as great a quantity of the oxide used as is reasonably possible. Such a quantity roughly corresponds to the amount of pigment in common house paint. Preferred results are, however, achieved by first applying to a surface molybdenum disulfide solid lubricant in approximately the thickness in which a film of this compound is used for lubricating purposes, and then covering this film with an oxide parting agent as indicated.

Such compounds can be applied to a part used for forming purposes either after a body is formed of metal powder against such a part or before a body is formed against such a part. Thus, with the present invention both the punch 48 and the punch plate 50 may be first coated with a layer 58 of molybdenum disulfide and then a layer 60 of an oxide such as titanium dioxide prior to the use of the molding apparatus 10 in forming metal powder into a body 56, or these coatings can be applied after such forming has been accomplished.

In either event the coated punch 48 and punch plate 50 are held as shown in FIGURE 5 with respect to the body 56 as the body is sintered in accordance with established practice. Thus, during the sintering of a body formed of powdered iron in an inert or reducing atmosphere temperatures of from about 1900° F. to 2250° F. will be applied for a period sufficient to bond the compacted metal powder and reduce organic materials such as paper to a carbon separation layer. After such heating the punch 48 and punch plate 50 are preferably left in place as the completed structure is cooled in order to effectively eliminate any possibility of warping during cooling.

Figure 6:
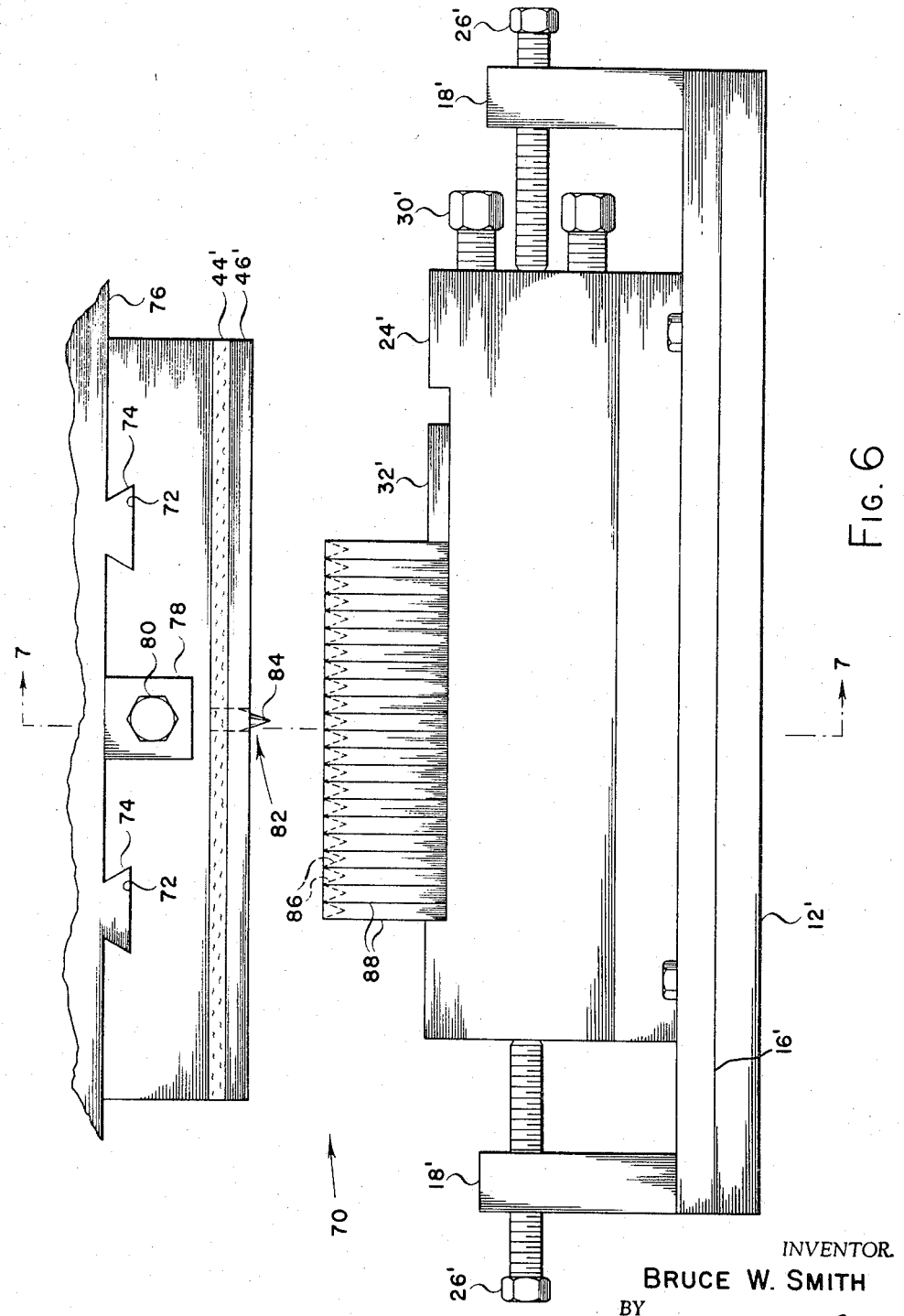
FIGURE 6 is a side elevational view corresponding to FIGURE 1 of a modified apparatus of this invention.
Figure 7:
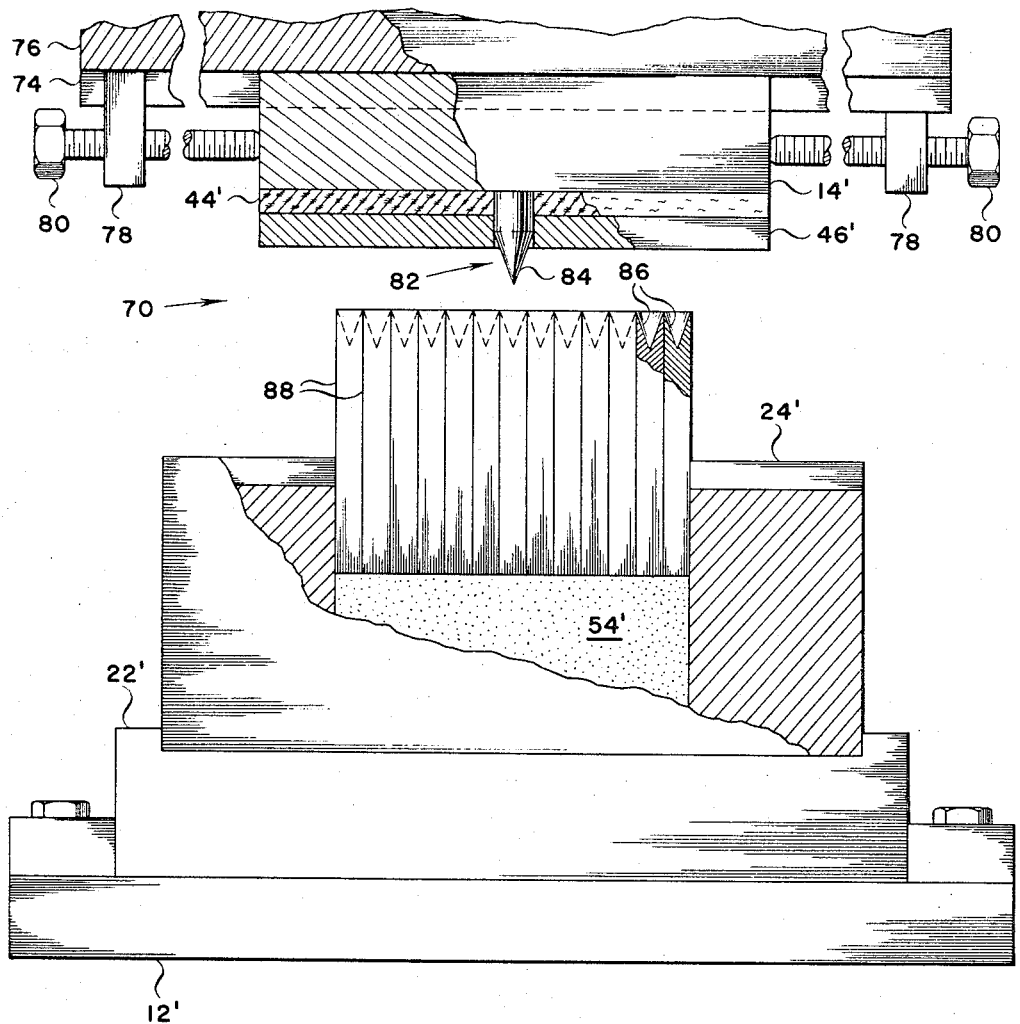
FIGURE 7 is a cross-sectional view taken at line 7—7 of FIGURE 6.

In FIGURES 6 and 7 of the drawings there is shown a modified apparatus 70 of this invention which is closely related to the apparatus 10 previously described. In order to minimize the length of this specification those parts of the apparatus 70 which are the same as or substantially the same as corresponding parts of the apparatus 10 are not separately described herein, and are designated both in the remainder of this specification and in the accompanying drawings by the primes of the numerals previously used to designate such parts.

The apparatus 70 differs from the apparatus 10 in that the movable platen 14′ employed in it is provided with support grooves 72. These grooves 72 extend parallel to one another and engage ways 74 in the nature of support rails mounted upon an upper platen 76. Preferably this upper platen 76 forms a part of a conventional hydraulic press (not shown) and is movable toward and away from a fixed platen 12′ which also forms a part of such a press (not shown). Other positioning brackets 78 are located upon the upper platen 76; these brackets 78 carry other positioning screws 80. The screws 80 engage the platen 14′ so as to be capable of being used in locating this platen 14′ along the ways 74.

In the apparatus 70 the plunger member 36 previously described is replaced by another plunger member 82. The member 82 is mounted on the platen 14′; it is provided with a tapered, somewhat pointed surface 84 which points towards the mold 22′. This member 82 is surrounded by resilient layers 44′ and 46′ of a rigid character.

The surface 84 of the plunger member 82 is shaped so as to fit within a correspondingly shaped depression or hole 86 in any one of identical compacting members 88. These members 88 are used instead of the compacting members 34 in the apparatus 70. Each of these members 88 is rod-like and of a square cross-sectional configuration. As they are used they fit next to one another in a "close" manner within the interior of the mold 22′ so as to extend parallel to the walls 24′.

The use of the apparatus 70 is essentially the same as the use of the apparatus 10. As it is employed, the position of the plunger member 82 along the ways 74 with respect to the mold 22′ can be varied through the adjustment of the screws 80. These ways 74 extend at right angles and to the rails 16′ on the fixed platen 12′. The mold 22′ is adjustable along these rails 16′ as previously described.

Because of this "double" adjustability the plunger member 82 can be located above and in alignment with any one of the compacting members 88. This enables the apparatus 70 to be used in the same manner as the apparatus 10 so as to apply pressure during a compacting operation. However, as the apparatus 70 is used such pressure is applied in localized areas whereas with the apparatus 10, pressure is applied within the mold 20 along a strip. The application of pressure to material within the mold 22′ in the apparatus 70 in this manner is considered very advantageous when the mold 22′ is being used in creating a complex or intricately shaped body since it enables a pressure distribution or balance to be achieved within the mold 22′ which cannot be achieved with the apparatus 10.

From a careful consideration of this specification those skilled in the field of powder metallurgy will realize that the apparatus described herein achieves and can be used to achieve the indicated advantages of this invention. They will also realize that the methods herein described offer advantages not possessed by related prior art processes.

I claim:
1. A method of molding a quantity of powdered metal within a mold which comprises:
   placing a quantity of powdered metal within a mold having a bottom and open top,
   inserting a plurality of closely fitting compacting members into said mold through said open top,
   selectively applying a force to each of said compacting members so as to move one of said compacting members at a time towards the bottom of said mold, and
   holding the other said members against movement away from said mold as said one of said members is forced towards the bottom of said mold, whereby said powdered metal is caused to be compacted and formed into a body.

2. The invention in accordance with claim 1, together with an additional step of causing relative motion laterally of said mold with respect to said force applying means so that different of said compacting members are engaged by said force applying mean.

3. The invention in accordance with claim 1, together with additional steps of:
   locating said body against a second metal body having the same configuration, and
   sintering said body in contact with said second body.

4. The invention in accordance with claim 1, together with additional steps of:
   coating a second metal body having the same shape and configuration as said compacted body of powdered metal with a release agent selected from a group consisting of titanium dioxide, zirconium dioxide, stannic dioxide, lead dioxide and zinc dioxide, locating said second metal body against said compacted body of powdered metal, and sintering said compacted body of powdered metal in contact with said second metal body.

5. A method as defined in claim 4 wherein said release agent is titanium dioxide.

6. The invention in accordance with claim 1, together with the additional steps of:

coating a second metal body having the same shape as said compacted body of powdered metal with a layer of molybdenum disulfide and with a layer of metal oxide selected from the group consisting of titanium dioxide, zirconium dioxide, stannic dioxide, lead dioxide and zinc dioxide, locating said second metal body against said compacted body of powdered metal, and sintering said compacted body of powdered metal in contact with said second metal body.

7. A method as defined in claim 6 wherein said metal oxide is titanium dioxide.

8. The invention in accordance with claim 1, together with the additional step of placing a sheet of non-adhesive material within the mold before the quantity of powdered metal is placed therein.

References Cited

UNITED STATES PATENTS

| 2,386,604 | 10/1945 | Goetzel | 75—214 X |
| 2,925,619 | 2/1960 | Sindelar | 18—16.5 X |
| 2,941,280 | 6/1960 | Hever | 29—470.9 |
| 3,158,474 | 11/1964 | Andersen | 75—214 |
| 3,166,617 | 1/1965 | Munk | 18—16.5 X |
| 3,283,365 | 11/1966 | Smith | 18—16 |

FOREIGN PATENTS

| 522,463 | 6/1940 | Great Britain | 75—212 |
| 951,726 | 3/1964 | Great Britain | 75—201 |
| 37/17,106 | 10/1962 | Japan | 75—212 |
| 38/3,552 | 4/1963 | Japan | 75—201 |

OTHER REFERENCES

Goetzel: "Treatise on Powder Metallurgy," vol. I, Interscience Pub., N.Y., 1949, pp. 1–2, 350–51.

CARL D. QUARFORTH, *Primary Examiner.*

L. DEWAYNE RUTLEDGE, *Examiner.*

A. J. STEINER, *Assistant Examiner.*